United States Patent [19]

Uchida

[11] Patent Number: 4,585,366
[45] Date of Patent: Apr. 29, 1986

[54] FLEXIBLE CONNECTOR

[75] Inventor: Kanzaburo Uchida, Mooka, Japan

[73] Assignee: Daiichi Denshi Kogyo Kabushiki Kaisha, Tokyo, Japan

[21] Appl. No.: 684,627

[22] Filed: Dec. 21, 1984

[30] Foreign Application Priority Data

Dec. 28, 1983 [JP] Japan .................. 58-199315[U]

[51] Int. Cl.$^4$ ............................................. F16B 41/00
[52] U.S. Cl. ................................. 403/21; 403/405.1
[58] Field of Search ................. 403/21, 405, 408, 372; 411/352, 353, 337, 361

[56] References Cited

U.S. PATENT DOCUMENTS

| | | | |
|---|---|---|---|
| 1,409,606 | 3/1922 | Steudahl | 411/353 |
| 2,886,354 | 5/1959 | Bjorklund | 403/372 |
| 3,129,472 | 4/1964 | Hensel | 411/337 X |
| 3,560,132 | 2/1971 | Gulistan | 411/361 |
| 4,212,224 | 7/1980 | Bragg, Jr. et al. | 411/337 |

Primary Examiner—Andrew V. Kundrat
Attorney, Agent, or Firm—Silverman, Cass & Singer

[57] ABSTRACT

A flexible connector includes a molded body of a soft material integrally molded with a connector body and connecting at least one cable, and locking screws passing through mounting lugs of the molded body and threadedly engaging internal threads of a mating device such as a receptacle. The connector comprises sleeves each fitted in the mounting lug and having an inner diameter larger than an outer diameter of a screw-threaded portion of the locking screw. Each sleeve is formed on its inside with at least one latch protrusion by calking at a location corresponding to a shank of the locking screw having an outer diameter less than the outer diameter of the screw-threaded portion so as to prevent the screw-threaded portion of the locking screw from passing through the sleeve, thereby reliably holding the locking screws in the mounting lug so as to prevent loosening and inadvertent removal of the locking screws, and positively connecting the connector to the receptacle without the possibility of undertightening of the locking screws and without any risk of damage of the mounting lugs.

7 Claims, 8 Drawing Figures

FLEXIBLE CONNECTOR

BACKGROUND OF THE INVENTION

1. Field of the Invention

This invention relates to a flexible connector having a molded body of a soft resin or rubber, and more particularly to a flexible connector having means for preventing locking screws connecting the connector to a mating device from becoming loose and inadvertently removed from the connector.

2. Description of the Prior Art

In a connector, as shown in a partial sectional view of FIG. 1, a connector body 1 and a cable 2 connected thereto are integrally molded together with a soft resin or rubber forming the molded body 3 to prevent a connection between the cable 2 and the connector body 1 from being adversely affected by a tensile force acting upon the cable 2. Moreover, the molded body 3 is formed with a protective portion 3a at a location where the cable extends from the molded body 3, thereby preventing breaking of the cable which is likely to be bent in use.

A connector is often used in instances where it is desired to prevent inadvertent disconnection of the connector from a receptacle 4 due to a tensile force being exerted on the cable, or other instances such as to prevent stoppage of a device. In such a case, the molded body 3 is provided on both sides with mounting lugs 3b having apertures 3c for locking screws 5 as shown in FIG. 1. The locking screws 5 are screwed into female screw members 6 of the receptacle 4 in alignment with the apertures 3c of the lugs 3b to securely connect the connector to the receptacle 4. In order to facilitate the connection of the connector to the receptacle 4, in this case, each aperture 3c comprises a narrower portion 3d whose diameter is less than that of a shank of the locking screw 5 as shown in FIG. 2a, so that the narrower portion 3d holds the locking screw 5 by reason of the elasticity of the lug 3b which is made of soft resin or rubber. This eliminates the need for use of a separately prepared locking screw.

With this arrangement, however, when the locking screws 5 are tightened to clamp the lugs 3b to the female screw members 6, the lugs 3b made of the soft resin or rubber are deformed or collapsed by heads 5a of the locking screws 5, so that an operator cannot determine when to stop tightening the locking screws. Therefore, the operator tends to tighten the locking screws 5 to their extreme positions in order to avoid undertightening of the locking screws. As a result, slots 5b of the screw heads 5a are likely to be broken making it impossible to unscrew the locking screws 5; further the lugs 3b are liable to be damaged due to their twisting deformation caused by the friction between the lugs and the heads 5a of the locking screws 5 being rotated.

SUMMARY OF THE INVENTION

It is an object of the invention to provide an improved flexible connector which eliminates all the disadvantages of the prior art and is capable of positive connection to a mating device such as a receptacle without the possibility of undertightening of locking screws and without any risk to damage of mounting lugs, and capable of reliably holding the locking screws in the mounting lugs so as to avoid loosening and inadvertent removal of the screws.

In order to achieve this object, the flexible connector includes a molded body of a soft material integrally molded with a connector body connecting at least one cable, and includes locking screws associated with said molded body and threadably engaging internal threads of a mating device such as a receptacle to which said cable is to be connected. The connector of the invention comprises sleeves, each having an inner diameter larger than an outer diameter of the screw-threaded portion of said locking screw and fitted in said molded body, each said sleeve comprising on its inside at least one latch protrusion formed thereon extending inwardly at a location corresponding to a shank of said locking screw having an outer diameter less than said outer diameter less than said outer diameter of said screw-threaded portion so as to prevent said screw-threaded portion of the locking screw from passing through the sleeve.

In a preferred embodiment of the invention, the molded body is formed with at least one mounting lug in which a sleeve fitting aperture is formed for fitting the sleeve therein.

In another embodiment of the invention, the sleeve comprises small flanges at its ends to hold it in the mounting lug and to constitute a seat for a head of the locking screw.

The sleeve is preferably formed with two diametrically opposed latch protrusions.

The mounting lug may be formed with at least one hole extending from a surface of the lug to the sleeve or terminating short of the sleeve to facilitate the forming of the latch protrusions by calking.

The invention will be more fully understood by referring to the following detailed specification and claims taken in connection with the appended drawings.

BRIEF DESCRIPTION OF THE DRAWINGS

FIG. 3c is a sectional plan view of a mounting lug of the connector shown in FIG. 3a;

DETAILED DESCRIPTION OF THE PREFERRED EMBODIMENT

Figure 3A:
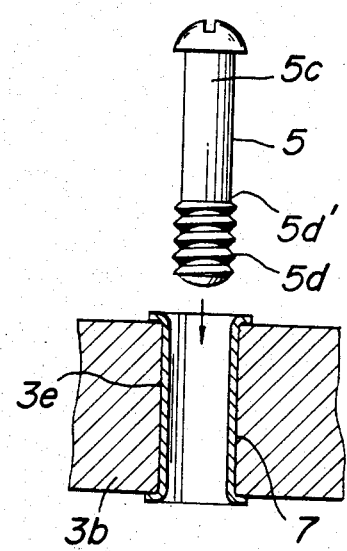
FIG. 3a is a partial sectional view of a connector of one embodiment of the invention.
Figure 3B:
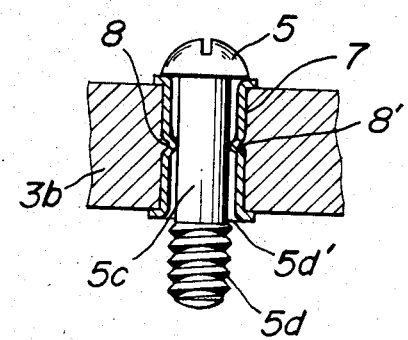
FIG. 3b is a sectional view similar to FIG. 3a, showing a sleeve formed with latch protrusions after insertion of the locking screw.
Figure 3C:
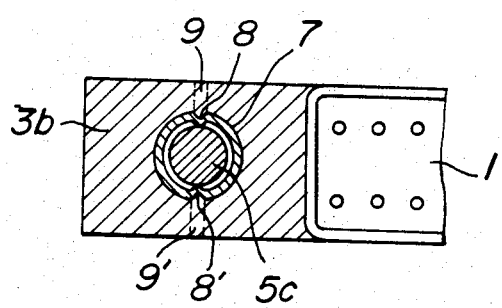

FIGS. 3a, 3b and 3c illustrate a preferred embodiment of the invention. Each lug 3b of a molded body 3 is formed with a sleeve fitting aperture 3e in which is fitted a sleeve 7 having an inner diameter larger than an outer diameter of a screw-threaded portion 5d of a locking screw 5 as shown in FIG. 3a. After each locking screw 5 has been inserted into the sleeve 7 fitted in the lug 3b, the sleeve 7 is formed with latch protrusions 8 and 8' at locations corresponding to the shank 5c of the locking screw 5. Protrusions 8,8' are formed by calking, for example, with pins by reasons of the flexibility of the lug 3b, such that tips of the latch protrusions 8 and 8' are in slight contact with the shank 5c of the locking screw 5 and the distance between the tips is less than the outer diameter of the screw-threaded portion 5d of the locking screw 5, as shown in FIGS. 3b and 3c.

Figure 1:
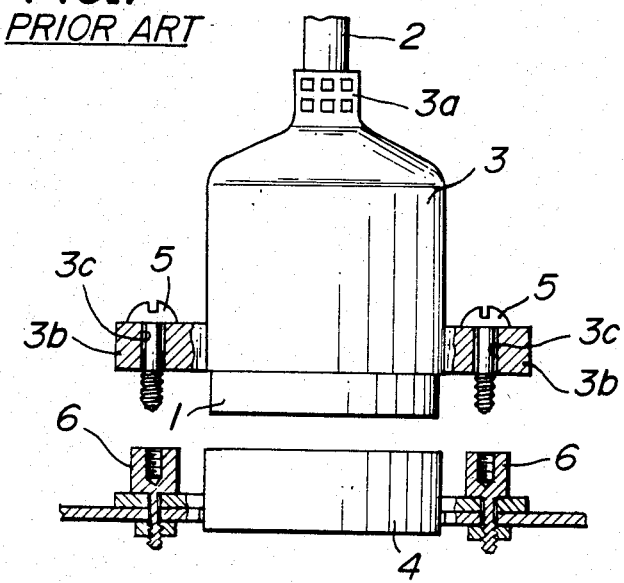
FIG. 1 is a partial sectional front view of a flexible connector with locking screws of the prior art.
Figure 2A:
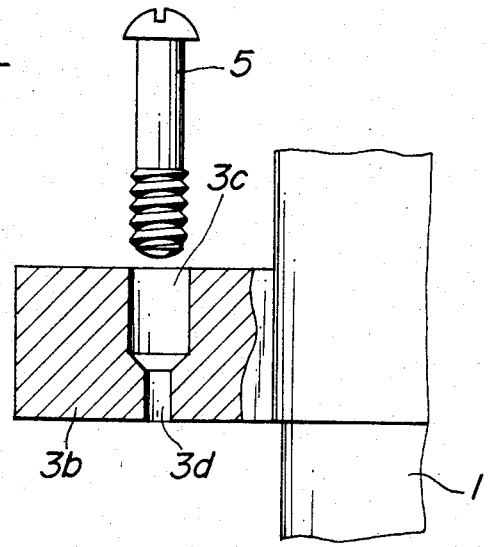
FIG. 2a is a sectional view of a part of the connector shown in FIG. 1 illustrating means for holding the locking screw.
Figure 2B:
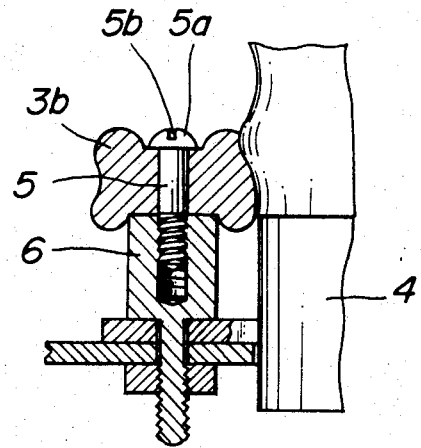
FIG. 2b is a sectional view of a part of the connector shown in FIG. 1 illustrating a clamped condition of a mounting lug by the locking screw.

In this arrangement of the sleeves 7 provided for the locking screws 5, the sleeves determine optimum tightened positions of the locking screws 5, thereby eliminating all of the disadvantages in the prior art shown in FIGS. 2a and 2b, such as the deformation and breaking down of the lugs 3b, the damage of locking screws due to overtightening and the possibility of undertightening of the locking screws resulting from their unsecured end positions.

As shown in FIG. 3a, the sleeve is preferably provided at its ends with small flanges to hold it in the mounting lug and to form a seat for a head of the locking screw when fully tightened.

According to the invention, after the locking screw 5 has been inserted into the sleeve 7, the latch protrusions 8 and 8' are provided on sleeve 7 on the both sides of the shank 5c of the locking screw 5 by an operation such as calking. Therefore, even if there are dimensional errors of the locking screws 5 which occur in manufacturing, the latch protrusions 8 and 8' are so formed to ensure that the tips of the protrusions are closely adjacent to or in slight contact with the shanks of the locking screws so as to permit rotation of the screws. Accordingly, even if the diameters of the shanks 5c of the locking screws 5 vary due to dimensional errors in manufacturing, shoulders 5d' caused by the difference in diameters of the shanks 5c and screw threaded portions 5d assure securement of the locking screws 5, thereby preventing them from becoming loose and inadvertently removed.

Figure 4:
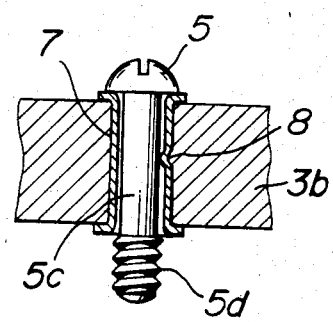
FIG. 4 is a partial sectional view of a connector of another embodiment of the invention.

In the above embodiment, although the two latch protrusions 8 and 8' are formed on the sleeve 7 in diametrical opposition to each other, an alternate number of protrusions may be selected such as one or three. As shown in FIG. 4, for example, only one latch protrusion 8 may be provided on the sleeve 7 which may be sufficient to hold the locking screw 5 in the sleeve 7.

Figure 5:
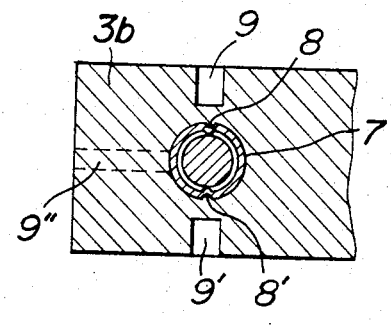
FIG. 5 is a partial sectional view of a connector of a further embodiment of the invention illustrating another calking method.

Moreover, in most cases, the latch protrusions 8 and 8' can be formed on an inside of the sleeve 7 by calking on its outer side after it has been fitted in the lug 3b, because of the flexibility of the lug which is constructed of soft resin or rubber. Holes 9 and 9' (shown in broken lines in FIG. 3c) may be provided through the lug 3b from its surfaces to the sleeve 7 for receipt of calking or holes 9, 9' and 9" (shown in FIG. 5) having suitable lengths may be formed in order to facilitate formation of the latch protrusions on the sleeve 7.

It is of course understood that the sleeve in which the locking screw has been inserted may be formed with the latch protrusions before the sleeve is fitted in the hole of the mounting lug.

As can be seen from the above description, the invention provides a flexible connector having locking screws which are reliably held in their mounting lugs so as to prevent loosening and inadvertent removal of the screws, thereby ensuring positive and prompt connection of the connector to a mating device with ease. Such an effect of the connector according to the invention is significant in its practical use.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A flexible connector including a molded body of soft material integrally molded with a connector body, said molded body including at least one mounting lug in which a sleeve fitting aperture is formed, at least one locking screw associated with said molded body and threadedly engaging internal threads of a mating device such as a receptacle, said connector comprising, at least one sleeve having an inner diameter larger than the outer diameter of a screw-threaded portion of said locking screw and fitted in said sleeve fitting aperture, said sleeve including on its inner-facing surface at least one latch protrusion extending inwardly at a location corresponding to the shank of said locking screw having an outer diameter less than said outer diameter of said screw-threaded portion so as to prevent said screw-threaded portion of the locking screw from passing through the sleeve, said mounting lug including at least one hole formed therein for facilitating forming of the latch protrusion.

2. A connector as set forth in claim 1, wherein said hole for facilitating forming of the latch protrusion extends from a surface of the mounting lug to said sleeve.

3. A connector as set forth in claim 1, wherein said hole for facilitating forming of the latch protrusion extends from a surface of the lug and stops short of the sleeve.

4. A connector as set forth in claim 1, wherein the number of said mounting lugs is the same as the number of said locking screws.

5. A connector as set forth in claim 1, wherein said sleeve comprises small flanges at its ends for retaining it in the mounting lug and to form a seat for a head of the locking screw.

6. A connector as set forth in claim 1, wherein said latch protrusion is formed by calking.

7. A connector as set forth in claim 1, wherein said sleeve is formed with two latch protrusions in diametrical opposition to each other.

* * * * *